Dec. 9, 1941.  W. T. GOLLWITZER  2,265,133
CLUTCH
Filed Nov. 8, 1938  3 Sheets-Sheet 1
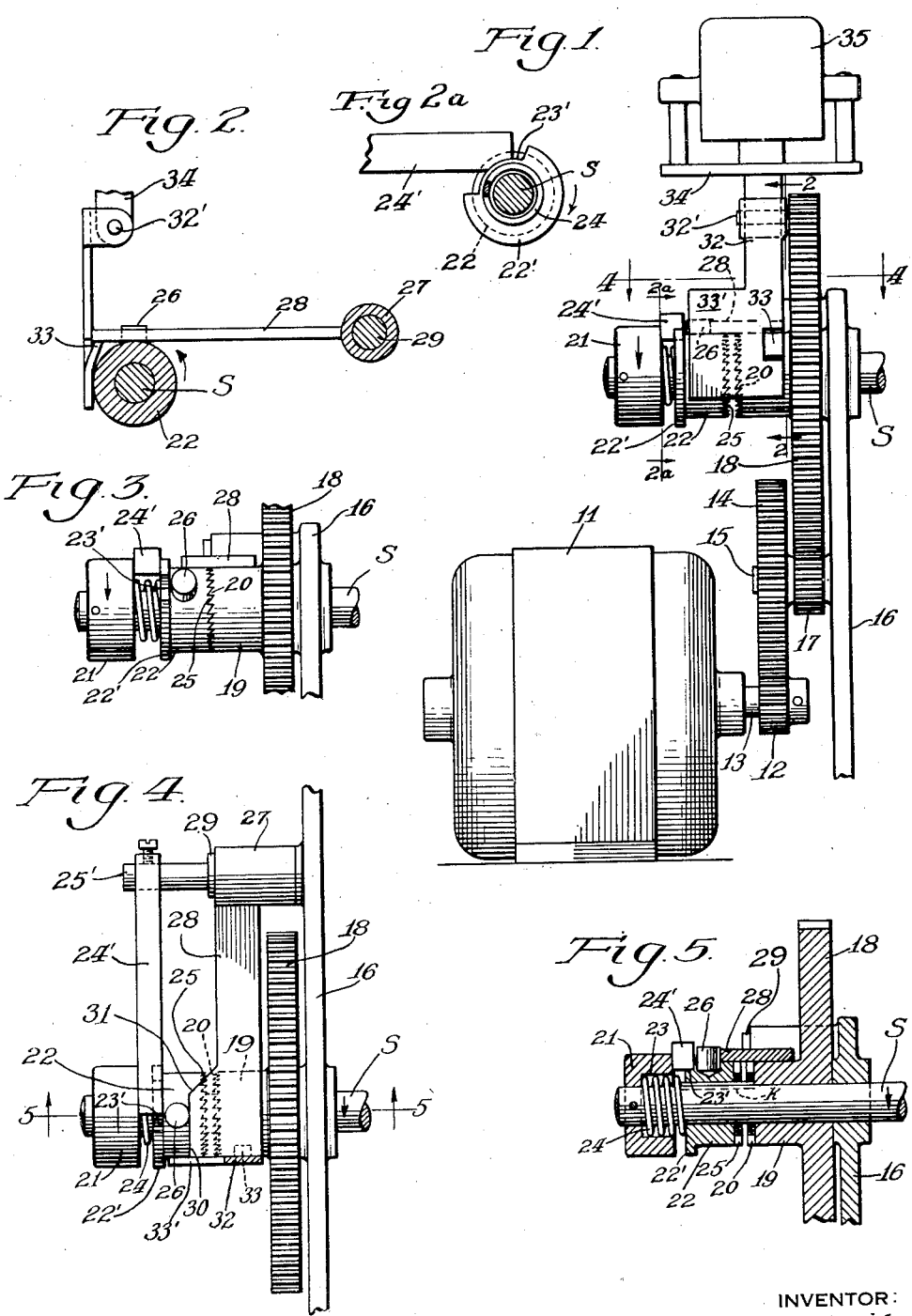
INVENTOR:
Walter T. Gollwitzer,
BY Belt, Wallace & Cannon
ATTORNEYS Dec. 9, 1941.        W. T. GOLLWITZER        2,265,133
CLUTCH
Filed Nov. 8, 1938        3 Sheets-Sheet 2
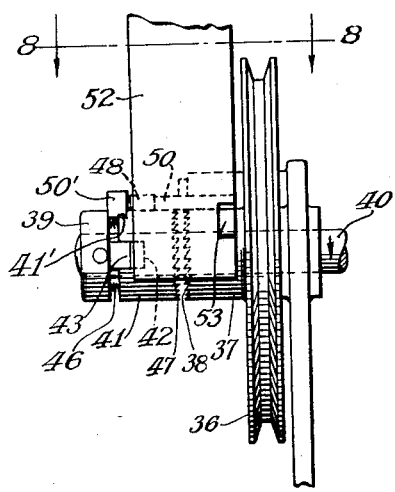
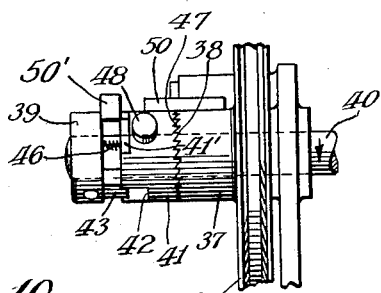
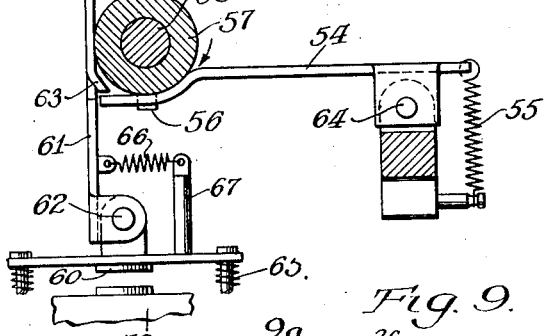
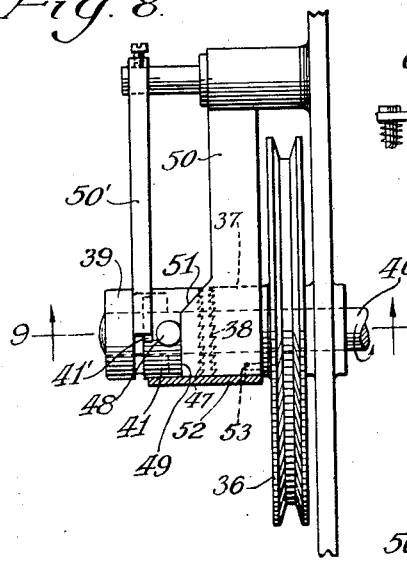
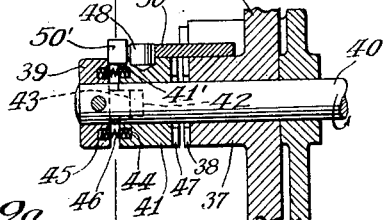
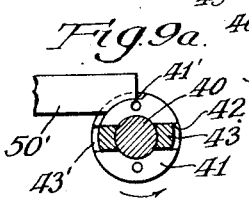
INVENTOR:
Walter T. Gollwitzer,
BY Belt, Wallace & Cannon
ATTORNEYS Dec. 9, 1941.   W. T. GOLLWITZER   2,265,133
CLUTCH
Filed Nov. 8, 1938   3 Sheets-Sheet 3
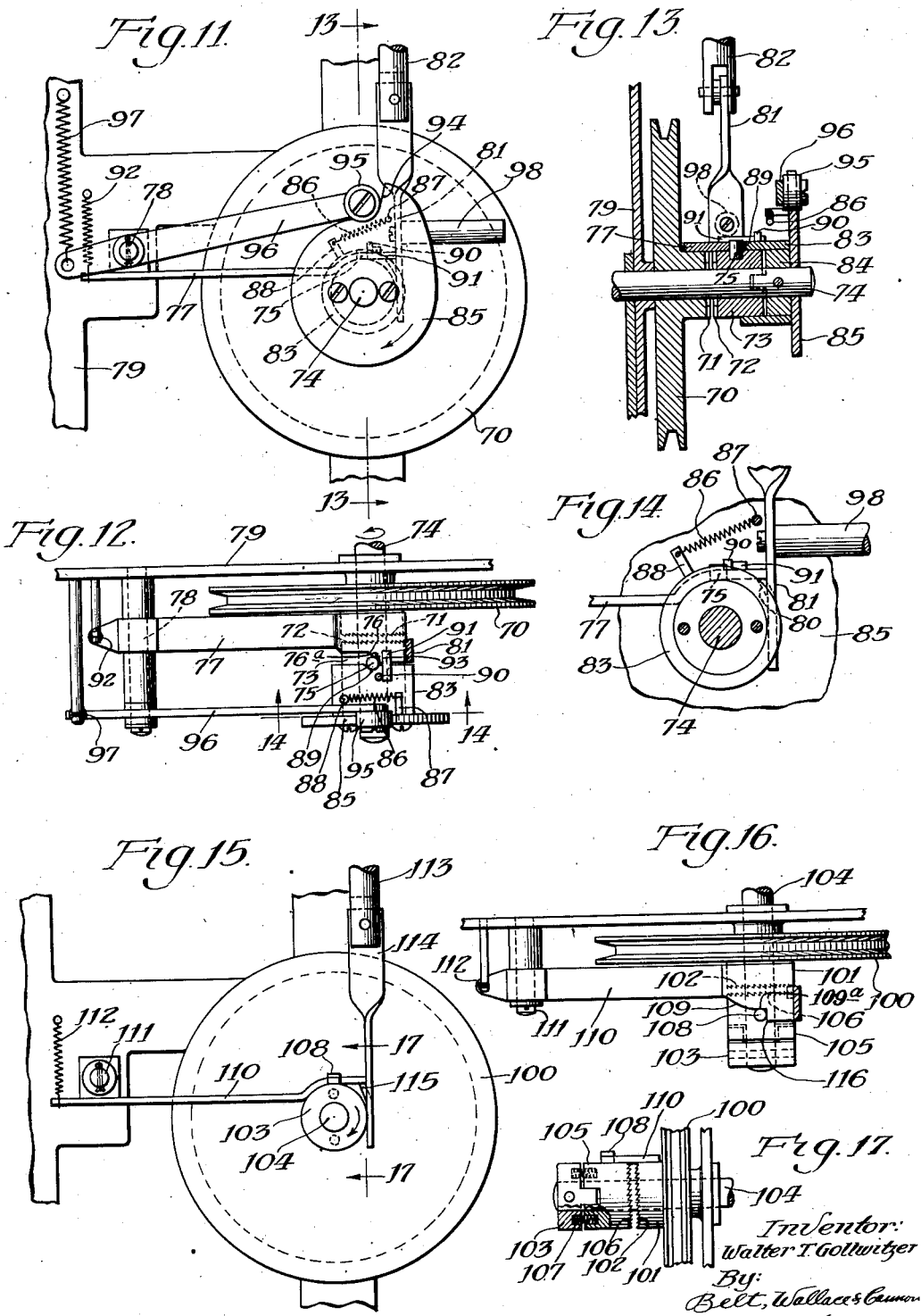
Inventor:
Walter T. Gollwitzer
By:
Belt, Wallace & Cannon
Attorneys Patented Dec. 9, 1941

2,265,133

UNITED STATES PATENT OFFICE 2,265,133

CLUTCH

Walter T. Gollwitzer, Euclid, Ohio, assignor to Addressograph-Multigraph Corporation, Wilmington, Del., a corporation of Delaware Application November 8, 1938, Serial No. 239,561

20 Claims. (Cl. 192—24)

This application is in part a continuation of my application Serial No. 179,348, filed December 11, 1937, which in turn in part is a continuation of my application Serial No. 65,376, filed February 24, 1936, now Patent No. 2,132,411, patented October 11, 1938, and this application is also in part a continuation of my co-pending application Serial No. 221,841, filed July 28, 1938.

This invention relates to clutches and more specifically to that type of clutch adapted to effect predetermined operation of the means under control thereof as, for example, to cause such means to come to rest in an identical position after each operation thereof effected under control of the clutch or, as a further example, to cause the means which are revolvable to make but a single revolution or part of a revolution in each operation thereof effected under control of the clutch.

One of the important objects of this invention is to positively separate the separable driving and driven portions of a novel clutch against the action of means impositively uniting such separable portions, and objects ancillary to the foregoing are to cam the separable driving and driven portions of a clutch apart by direct operation of cam means on at least one of such separable portions and to effect separation of such separable portions by the force being transmitted through the clutch.

Clutches of the type to which this invention pertains may be employed in calculating, printing and like machines wherein rapidity and accuracy of operation are important particularly since the clutches are employed in such machines to time operations, and hence among the important objects of this invention is to provide a novel rapidly and accurately operating clutch suitable for use in calculating, printing and like machines. Furthermore, in machines of the just referred to type spring-loaded or other members subjected to force are restrained in their movement through the action of clutches such as that to which this invention relates, and in such instances it is essential that the spring load or other force which is restrained by such a clutch be prevented from so retroactively affecting the clutch that premature or other undesired disengagement of the clutch is effected and therefore still another object is to prevent a retroactive force from so affecting a clutch that undesired disengagement of the clutch will not be brought about.

Another important object of my invention is to employ retractable means to hold the separable driving and driven portions of my novel clutch apart and to quickly unite such portions upon retraction of the retractable means, and a further object related to the foregoing is to employ the same means to both effect separation of the driving and driven portions of the clutch and to hold such portions separated upon separation thereof.

Still other objects of this invention are to insure positive return of mechanisms under control of the driven portion of my novel clutch to an identical at rest position at the end of each operation thereof; to positively unite the separable driving and driven portions of the clutch at the start of an operation to be effected through the clutch.

Still another object is to provide a novel rapidly acting clutch of simple and economical but long-lived and sturdy construction and of efficient, accurate and positive operation.

Selected embodiments of my invention are illustrated in the accompanying drawings wherein Fig. 1 is a front elevation of an apparatus embodying my novel clutch which is shown disengaged in this view;

Fig. 2 is a fragmentary vertical sectional detail view taken substantially on the line 2—2 on Fig. 1;

Fig. 2a is a sectional detail view taken on the line 2a—2a on Fig. 1;

Fig. 3 is a fragmentary elevational view showing the clutch illustrated in Fig. 1 engaged;

Fig. 4 is a view taken substantially on the line 4—4 on Fig. 1;

Fig. 5 is a view taken substantially on the line 5—5 on Fig. 4;

Fig. 6 is a front elevation similar to Fig. 1 and showing a modified form of my novel clutch;

Fig. 7 is a view, similar to Fig. 3, of the form of my clutch shown in Fig. 6;

Fig. 8 is a top plan view taken substantially on the line 8—8 on Fig. 6;

Fig. 9 is a sectional detail view taken substantially on the line 9—9 on Fig. 8;

Fig. 9a is a sectional detail view taken on the line 9a—9a on Fig. 9;

Fig. 10 is a view partly in elevation and partly in section of still another form of my novel clutch;

Fig. 11 is a side elevation of yet another form of my novel clutch;

Fig. 12 is a top plan view of the clutch shown in Fig. 11;

Fig. 13 is a vertical sectional view taken substantially on the line 13—13 on Fig. 11;

Fig. 14 is a transverse sectional view taken substantially on the line 14—14 on Fig. 12;

Fig. 15 is a view similar to Fig. 11 but showing still another form of my novel clutch;

Fig. 16 is a top plan view of the clutch shown in Fig. 15; and

Fig. 17 is a fragmentary detail view taken substantially on the line 17—17 on Fig. 15 and in which parts are broken away.

In the selected embodiments of my invention shown in the accompanying drawings and more particularly in the embodiment illustrated in Figs. 1 to 5, inclusive, my novel clutch is employed to control the imparting of movement to a shaft S from an electric motor or other source of power 11.

In the present instance a pinion 12 is fast on the shaft 13 of the motor 11 and meshes with a gear 14 rotatably mounted on a stub shaft 15 carried by the frame member 16. The gear 14 is fixedly connected to a pinion 17 also rotatably mounted on the stub shaft 15, and the pinion 17 in turn meshes with a gear 18 that is rotatably mounted on the shaft S which is journaled in the frame member 16.

As best shown in Figs. 3 and 5, the gear 18 includes an integral hub 19 that is disposed about the shaft S and the free end of which is serrated to provide clutch teeth 20. The hub 19 with the clutch teeth 20 in cooperation with the gear 18 constitute the driving portion of my novel clutch and it is to be understood that, while the hub 19 is shown integral with the gear 18, it might be suitably joined thereto within the purview of my invention.

The driven portion of my novel clutch comprises a fixed part 21 and a movable part 22, the fixed part being pinned or otherwise suitably secured to the shaft S and the movable part being slidably but non-rotatably mounted on said shaft as by being connected thereto by a key K. As best shown in Fig. 5, the fixed part 21 has an inwardly opening pocket 23 therein into which a spring 24, disposed about the shaft S, is extended, said spring 24 bearing on the adjacent end of the movable part 22 to urge this part toward the driving portion of the clutch to thereby tend to seat the clutch teeth 25 on the movable part 22 in engagement with the clutch teeth 20 on the hub 19.

In this form of the clutch a pin or stud 26 is fast in the movable part 22 and extends radially therefrom beyond the periphery thereof. A hub 27 at one end of a plate or abutment member 28 is pivotally mounted on a stud 29 carried by the frame member 16. The free end of the plate 28 is disposed to lie above the hub 19 of the driving portion of the clutch and the movable part 22 of the driven portion of the clutch and this end of the plate is widened to provide a stop edge 30. A cam surface 31 on the plate 28 leads to the stop edge 30.

When the clutch is disengaged the stud 26 engages the stop edge 30 and thereby against the action of the spring 24 the teeth 25 are held out of engagement with the teeth 20. When however the clutch is to be engaged, the plate or abutment member 28 is pivoted upwardly to retract the stop edge 30 from engagement with the stud 26 whereupon the spring 24 forces the teeth 25 toward the teeth 20. The teeth 20 and 25 are cooperatingly angled so as to insure seating of the teeth 25 in the spaces between the teeth 20, and vice versa. Thus upon retraction of the stop edge 30 from engagement with the stud 26 the spring 24 causes the teeth 25 to quickly engage the teeth 20 whereby the driven and driving portions of the clutch are quickly united. Inasmuch as the movable part 22 is keyed to the shaft S by the key K, the shaft takes motion as soon as the teeth 25 engage the teeth 20. The teeth 20 and 25 are so numerous and so distributed that it is necessary for there to be but little relative movement before the teeth are seated in contradistinction to the usual jaw clutch arrangement wherein parts may move appreciably before interengagement ensues.

So long as the stop edge 30 is maintained out of cooperating relation with the stud 26, the teeth 25 will remain engaged with the teeth 20 and the shaft S will continue rotation with the gear 18 which receives power from the motor 11. However, my novel clutch is particularly adapted for use as a so-called one-revolution clutch. Hence, it is preferable that the stop edge 30 be retracted only long enough to permit the stud 26 to pass beyond this stop edge in the course of movement thereof with the movable part 22 after engagement of the teeth 25 with the teeth 20. As soon as the stud 26 has passed beyond the stop edge 30 the plate 28 may be permitted to return to its initial or stopping position, one manner in which this may be expeditiously accomplished being described presently.

The stud 26 moves with the movable part 22 and in the course of its movement engages the cam surface 31 and thereupon rides therealong. The inclination and disposition of the cam surface 31 is such that as the stud 26 rides therealong toward the stop edge 30 the teeth 25 are retracted from engagement with the teeth 20 and by the time the juncture of the cam surface 31 with the stop edge 30 is attained said teeth are completely disengaged. The juncture of the cam surface and stop edge is so positioned that after disengagement of the teeth 20 and 25 the momentum of the driven parts will cause these parts to continue movement and hence the stud 26 will come to rest along the stop edge 30 in a position identical with that occupied at the time of retraction of the stop edge 30 from engagement with the stud, which position is spaced from the aforesaid juncture. It will be apparent that the inclination and terminus of the cam surface 31 may be computed, according to the momentum of the driven parts for each installation of the clutch, in order to insure such desirable positioning of the stud 26 and the driven parts of the clutch each time the stud 26 engages the cam surface 31 in a course of operation and disengagement of the separable portions of the clutch ensues. Furthermore, by varying the location of the cam surface 31 in the path of movement of the stud 26, the time of disengagement of the teeth 25 from the teeth 20 may be controlled whereby operation of the driven parts of the clutch may be regulated as desired.

Another important feature of the foregoing arrangement is that the force being transmitted through the clutch is utilized to effect disengagement of the clutch.

It will be appreciated that the stop edge 30 on the abutment member 28 may be retracted from engagement with the stud 26 in a variety of ways but in the illustrated form of the invention an arm 32 is provided which has a shoulder 33 thereon that is adapted to underlie the marginal edge at the free end of the plate 28. In the present instance the arm 32 is pivotally connected at 32' to the armature 34 of the solenoid 36 (see Fig. 2). Whenever the solenoid 35 is energized the armature 34 thereof and therefore the arm 32 move upwardly and in the course of this upward movement the shoulder 33 engages the underside of the plate 28 and pivots it upwardly to thereby retract the stop edge 30 from engagement with the stud 26.

Since it is intended that the driven part of the clutch make but a single revolution the arm 32 includes a pad 33' that lies in the path of the stud 26 after it has moved beyond the stop edge 30, and as the stud engages this pad and rides thereover the arm 32 is pivoted outwardly whereupon the shoulder 33 disengages the plate or abutment member 28 which thereupon falls by gravity to its initial or normal position. Deenergization of the solenoid 35 enables the armature 34 thereof and the arm 32 to move downwardly, and preferably the inwardly disposed face of the shoulder 33 is inclined so as to insure that the shoulder will ride over the free end of the arm or plate 28 in such lowering movement and again be disposed in position to engage the underside of the plate 28 upon the next upward movement of the arm 32.

The solenoid 35 may be controlled by suitably located switch means, which switch means may be arranged in the manner shown and described in my application Serial No. 65,376 (now Patent No. 2,132,411, patented October 11, 1938), of which this application is in part a continuation in part or, by way of further example, in the manner shown in my application Serial No. 78,682 (now Patent No. 2,132,413, patented October 11, 1938).

In many instances the release or movement of spring-loaded members will be controlled by the rotation of the shaft S and this will tend to apply retroactive force on the shaft. Such force might result from other arrangements but in any event it may tend to cause the driven part of the clutch to operate more rapidly than the driving portion which is usually operated at a given constant speed. Such a retroactive force might tend to unseat the teeth 25 from the teeth 20 especially because of the inclination of the teeth. To prevent such undesired or premature unseating of the teeth and resultant disengagement of the clutch, suitable means are provided to positively maintain the teeth 20 and 25 engaged so long as the clutch is to be engaged or so long as such a retroactive force might have the effect of unseating or undesirably disengaging the teeth.

In the present instance the means which positively maintain the clutch teeth engaged after engagement of the clutch has been effected include a flange 22' at the end of the movable part 22 facing the fixed part 21 and which flange extends beyond the periphery of the part 22. The flange 22' and the adjacent portion of the movable part 22 are recessed as at 23'. When the clutch is disengaged the free end of an arm 24', which arm is pivotally mounted on an extension 25' of the stud 29, lies in the recess 23' and in such position that the inwardly disposed edge of this arm engages the vertical wall of the recess 23' that is aligned with the inwardly disposed face of the flange 22' as shown in Figs. 1, 4 and 5.

When the clutch is engaged and by the time the stud 26 has moved beyond the stop edge 30 the trailing end of the recess 23' will be beyond the end of the arm 24' and the inwardly disposed face of the arm will be engaging the outwardly disposed face of the flange 22' so that the arm 24' lies between the flange 22' and the adjacent face of the fixed part 21. So long as the arm 24' lies between the flange 22' and the face of the fixed part 21 the teeth 20 and 25 are positively held united and cannot disengage. By the time the stud 26 reaches the cam surface 31 in the course of rotation of the part 22 the leading edge of the recess 23' will be aligned with the arm 24' wherefore as the stud 26 rides over the cam surface 31 the movable part 22 may be retracted and disengagement of the clutch teeth effected so that when the rotation ceases the parts are restored to the position shown in Figs. 1, 4 and 5.

In the form of my invention shown in Figs. 6 to 9, inclusive, the driven part of my novel clutch comprises a pulley 36 having a hub 37 thereon including clutch teeth 38 similar to the clutch teeth 20.

In this instance the driven portion of my clutch includes as the fixed part thereof a collar 39 pinned or otherwise secured to the shaft 40 about which the pulley 36 and hub 37 are freely rotatable. The movable part 41 of the driven portion of my clutch has diametrically disposed pockets 42 therein at the end thereof faced toward the collar 39. The collar 39 includes ears 43 that extend toward and are seated in the pockets 42, said ears being of sufficient length to remain seated in the pockets in the movement of the movable part 41 toward and away from the fixed part or collar 39. The movable part 41 has sockets as 44 therein intermediate the pockets 42 and at the same end thereof. Sockets as 45 are provided in the fixed part 39 in alignment with the sockets as 44. Springs as 46 are seated in the aligned sockets as 44 and 45 and urge the movable part 41 away from the fixed part 39 to tend to seat the teeth 47, corresponding to the teeth 25, in engagement with the teeth 38.

A stud 48, similar to the stud 26, is provided on the movable part 41 and, when the clutch is disengaged, engages a stop edge 49 on the plate or abutment member 50, said stop edge 49 and plate 50 being similar to the stop edge 30 and the plate 28. A cam surface 51 is provided which is similar to the cam surface 31. An arm 52 is provided which is similar to the arm 32 and which has a shoulder 53 struck therefrom, this shoulder being for the same purpose as the shoulder 33.

The free end of an arm 50', similar to the arm 24', seats in a recess 41' in the movable part 41, as shown in Figs. 6, 8, 9 and 9a, the recess 41' being similar to the recess 23'. As long as the clutch is engaged, as shown in Fig. 7, arm 50' lies between adjacent faces of the parts 39 and 41 and maintains the teeth 38 and 47 engaged. The ears 43 are relieved at 43' to enable them to pass the arm 50' without unseating it.

The operation of the clutch shown in Figs. 6 to 9, inclusive, is similar to the operation of the clutch shown in Figs. 1 to 5, inclusive, the arm 52 being moved upwardly by the action of a solenoid or the like to cause the shoulder 53 to elevate the plate 50 and thereby retract the stop edge 49 from engagement with the stud 48 whereupon the springs 46 engage the teeth 47 with the teeth 38. The stud 48 engages the arm 52 during its movement with the movable part 41 and disengages the shoulder 53 from the plate 50 which thereupon falls by gravity to dispose the cam surface 51 in position to be engaged by the stud 48 in the course of movement of the part 41 and thereby cam the separable portions of my novel clutch apart and effect disengagement of the clutch. The arm 50' maintains the clutch in engagement and the recess 41' enables disengagement of the teeth in the same manner as that in which the arm 24' and recess 23' maintain the clutch teeth shown in Figs. 1 to 5 in engagement and enable disengagement thereof.

In the forms of my invention shown in Figs. 1 to 5 and 6 to 9, inclusive, the abutment members or plates 28 and 50 return to normal position by gravity after retraction thereof and when the studs 26 and 48 cause the shoulders 33 and 53 to be retracted from engagement with these plates. In the form of my invention shown in Fig. 10, the retractable abutment member 54, which corresponds to the plates or abutment members 28 and 50, is urged into and is returned to its normal position, shown in Fig. 10, by the spring 55. In other respects this form of my invention is similar to the forms heretofore described, except that an arm (not shown) similar to the arms 24' and 50' and for the same purposes may also be maintained in position by a suitable spring.

In the form of my invention shown in Fig. 10 a stud 56 on the movable part 57 of this clutch, which part is slidably mounted on shaft 58, engages a stop edge on plate 54, corresponding to stop edges 30 and 49, when the clutch is disengaged. When solenoid 59 is energized the armature 60 thereof is retracted against the springs 65 and thereupon the arm 61, pivotally connected to the armature at 62, moves downwardly and the shoulder 63 on arm 61 engages the plate 54 and pivots it downwardly about its pivotal mounting 64 against the action of spring 55 whereupon the stop edge on plate 54 disengages stud 56 and the clutch engages to drive the shaft 58 clockwise as viewed in Fig. 10. During rotation of the movable part 57, upon engagement of the clutch, the stud 56 engages the arm 61 and so pivots it against the action of the spring 66, that extends between the spring anchor 67 and said arm 61 to hold said arm in association with the plate 54, that the shoulder 63 is disengaged from the plate 54 whereupon the spring 55 returns this plate to its normal position shown in Fig. 10. Subsequently when the solenoid 59 is deenergized and the springs 65 restore the armature 60 and the plate 61 moves upwardly the inclined face of the shoulder 63 rides over the end of the plate 54 and causes the shoulder to again be disposed over the plate 54 to insure retraction of the plate upon the next energization of the solenoid 59.

When during the course of rotation of the part 57 the stud 56 engages the cam surface on the arm 54 the clutch is disengaged in the manner hereinabove described.

The clutch shown in Figs. 11 to 14, inclusive, includes a pulley 70 and clutch teeth 71 are provided at the free end of the hub of the pulley 70 and are adapted to be engaged by clutch teeth 72 on the adjacent end of a sleeve 73 slidably but non-rotatably mounted on the shaft 74. A pin 75 extends from the periphery of the sleeve 73 and is engageable with a cam surface 76 and a stop edge 76a on the arm 77 that is pivotally mounted as indicated at 78, Fig. 11, on the frame member 79. A shoulder 80 on an arm 81 extends beneath the free end of the arm 77 when the parts are in their at rest position. The arm 81 is pivotally connected to the core 82 of a suitable solenoid or the like, not shown, which is energized when the clutch is to be engaged. Upon energization of the solenoid the shoulder 80 pivots the arm 77 upwardly to disengage the stop edge 76a from the pin 75 and when this occurs the clutch teeth 72 are engaged with the clutch teeth 71, this being effected in the following manner.

A collar 83 is rotatably mounted on the sleeve 73 and the collar 84, the collar 84 being fast to the shaft 74 (see Fig. 13). A cam 85 is fast to the collar 84, and one end of a spring 86, Fig. 14, is fast to a spring anchor 87 on this cam 85 and to a pin 88 extending from the periphery of the collar 83, the spring 86 tending to rotate the collar 83 clockwise as viewed in Fig. 14. A notch 89, Fig. 12, is provided in the edge of the collar 83 extended toward the clutch teeth 72 and when the parts are in an at rest position the notch 89 is aligned with the pin 75 so that the cam surface 76 and the stop edge 76a may force the pin 75 into this notch whereby the clutch teeth 72 are maintained disengaged from the clutch teeth 71.

Another pin 90, Fig. 12, is fast in the collar 83 and engages a plate 91 carried by the arm 77 when the arm 77 is resting on the periphery of the sleeve 73. When the arm 77 is in this position the plate 91 is in position to engage the pin 90, this pin engaging this plate near the end of a revolution of the shaft 74 and thereupon the collar 83 is held against further rotation so as to position the notch 89 in proper alignment for entry of the pin 75. Such stopping of the collar 83, while the spring anchor 87 continues its movement, results in retensioning of the spring 86 so as to condition the collar 83 for the next clutch engaging operation.

However, when the solenoid is energized and the arm 77 is pivoted upwardly, against the action of the spring 92 that urges it toward the sleeve 73, not only is the stop edge 76a disengaged from the pin 75 but the plate 91 is disengaged from the pin 90 and as soon as this plate disengages this pin the spring 86 acts to rotate the collar 83 clockwise as viewed in Fig. 14. Thereupon the notch 89 is moved out of alignment with the pin 75 to engage the adjacent edge of the collar 83 with this pin whereupon the clutch teeth 72 are forcibly engaged with the clutch teeth 71 and thereby the shaft 74 is connected to the pulley 70 to rotate therewith.

As has been explained hereinabove in connection with clutches of this type, shortly after the sleeve 73 starts to rotate with the source of power the pin 75 engages the arm 81 and pivots this arm to disengage the shoulder 80 from the end of the arm 77. When this occurs the arm 77 is reseated by the spring 92 in engagement with the periphery of the sleeve 73. Then near the end of a complete revolution of the shaft 74 the pin 90 reengages the plate 91 and immediately thereafter the pin 75 engages the cam surface 76. As soon as the pin 90 engages the plate 91 the collar 83 stops rotating and at this same time the pin 75 will be riding up the cam surface 76 onto stop edge 76a and when the parts attain their at rest position the collar 83 will be in such a position that by the time the pin 75 engages the abutment edge 93 on the arm 77, at the end of the stop edge 76a, the parts will be in such a position that the pin 75 will be seated in the notch 89. When this pin is so seated the clutch teeth 72 are fully disengaged from the clutch teeth 71. It will be noted that this arrangement avoids the necessity of using springs to hold or maintain engagement of the clutch teeth as 72 with the clutch teeth 71.

If it is essential that the shaft 74 make a complete revolution each time it is set in operation then the cam 85 is provided. This cam includes a drop 94 that is so located thereon that when the shaft 74 is in its normal at rest position the roller 95 on the arm 96, that is pivotally mounted at 78, is seated in the bottom of the drop 94, this being assured by the action of the strong spring 97 on the arm 96. In event the shaft 74 does not make a complete revolution, the roller 95 will be positioned near the drop 94 and in this event the spring 97 will pivot the arm 96 to cause the roller 95 to move along the edge of the drop 94 and bring the shaft 74 into its normal at rest position.

It will be apparent upon examination of Figs. 11 to 14 that the clutch shown therein is in respects other than those hereinabove described similar to the clutches that have been described heretofore, one additional difference being however that a weight 98 is provided on the arm 81 to urge this arm toward the free end of the plate or arm 77.

The form of clutch shown in Figs. 15, 16 and 17 is similar to the clutches hereinabove described but this clutch includes an arrangement whereby stoppage of the driven parts in an identical position in each operation thereof is assured.

The clutch shown in these views includes a pulley 100 having a hub 101 thereon on which clutch teeth 102 are formed. This clutch also includes a fixed part 103 that is fast on the shaft 104 and a slidable part 105 which is constantly connected to the fixed part 103 and which has clutch teeth 106 thereon engageable with clutch teeth 102 on the hub 101 of the pulley 100, springs 107 acting between the fixed part 103 and the slidable part 105 to urge the clutch teeth 106 on the part 105 toward the clutch teeth 102 on the hub 101. A pin 108 extends from the periphery of the part 105 and, when the clutch is disengaged, this pin is engaged with a stop edge 109a at the end of a cam surface 109 on the plate 110. The plate 110 is pivotally mounted, as indicated at 111, and a spring 105 acts thereon to urge it toward the periphery of the part 112. A solenoid or the like, not shown, is provided and has a movable part or core 113 to which a plate 114 is pivotally connected, the plate 114 including a shoulder 115 that is adapted to seat under the free end of the plate 110.

When the solenoid is energized or the part 113 is otherwise moved upwardly the plate 114 moves upwardly to retract the stop edge 109a on the plate 110 from engagement with the pin 108 whereupon the clutch teeth 106 on the part 105 engage the clutch teeth 102 on the hub 101 to thereby connect the pulley 100 to the shaft 104 and thereupon the shaft 104 starts to rotate. The pin 108, soon after the shaft 104 starts to rotate with the pulley 100, pivots the plate 114 from engagement with the plate 110 whereupon the spring 112 returns this plate into engagement with the periphery of the part 105 so that near the end of the revolution the pin 108 will reengage the cam surface 109 and the stop edge 109a on the plate 110 and disconnect the clutch teeth 106 on the part 105 from the clutch teeth 102 on the hub 101. It will therefore be apparent that the shaft 104 makes but a single revolution each time the plate 114 is moved upwardly and restored before the end of a single revolution of the pulley 100.

It will be recalled that in the form of the invention shown in Figs. 1 to 5 the pin 26 rode onto the stop edge 30 to attain a predetermined position at the end of each operation and that the parts were constructed and arranged to insure identical positioning of the pin 26 at the end of each operation. In the form of the invention shown in Figs. 16, 17 and 18, such accurate construction and arrangement of the parts is avoided by providing an abutment edge 116 at the end of the stop edge 109a, this abutment edge being disposed to lie in the line of movement of the pin 108. The abutment edge 116 is located in such a position that after the teeth 106 have been fully disengaged from the teeth 102 the pin 108 will move into engagement with this abutment edge and thereby prevent further rotation of the driven parts of the clutch, and by arranging the parts so that the pin 108 will move into engagement with the abutment edge 116 in this manner it is assured that the driven parts will return to an identical position in each operation thereof.

It will be apparent from the foregoing description that I have provided a novel clutch which is particularly suitable for use as a one-revolution clutch. The clutch is also particularly useful in calculating, printing and similar machines primarily because of the fact that engagement of this clutch may be very rapidly effected, this advantage flowing from the number of and the inclination of the interengaging teeth. Furthermore, once the teeth are engaged they are positively held united until such time as disengagement thereof is to be effected, and this renders the clutch particularly useful in those instances where a retroactive force may be impressed upon the driven portion of the clutch as will be the case where the driven portion of the clutch controls the release of or movement of, for example, spring-loaded members.

It will be noted that the same means which effects engagement of the clutch holds the clutch disengaged and this means also acts to insure disengagement of the clutch for the reason that the stud on the movable part of the driven portion of the clutch engages the member which effects retraction of the abutment member with which the stud cooperates and such engagement positively insures release of the abutment member, which abutment member may either return to its normal position by gravity or be spring-urged into such position.

Many other advantages and novel features of the clutch of this invention will be apparent to one skilled in the art, and while I have illustrated and described selected embodiments of my invention it is to be understood that these are capable of variation and modification and I therefore do not wish to be limited to the precise details set forth but desire to avail myself of such changes and alterations as fall within the purview of the following claims.

I claim:

1. In a clutch embodying separable driving and driven portions, engageable means on opposing faces of said portions means for effecting engagement of said engageable means, an abutment member, a stop member fixedly arranged on one of said portions engageable with said abutment member in the course of operation of said clutch to effect separation of said separable portions and the disengagement of said engageable means, said stop member remaining in engagement with said abutment member to maintain said engageable means disengaged, and retracting means releasably engageable with the abutment member and operable to retract the abutment member from engagement with the stop member to permit operation of the means for effecting engagement of said engageable means, said retracting means being positioned in the path of movement of said stop member to be engaged by said stop member after engagement of said engageable means to thereby be released from the abutment member and permit return of the abutment member into position to be engaged by said stop member and thereby effect separation of said separable portions.

2. In a clutch embodying separable driving and driven portions, engageable means on opposing faces of said portions, yieldable means for effecting engagement of said engageable means, an abutment member, a stop member fixedly arranged on one of said portions engageable with said abutment member in the course of operation of said clutch to effect separation of said separable portions and the disengagement of said engageable means against the action of said yieldable means, said stop member remaining in engagement with said abutment member to maintain said engageable means disengaged against the action of the yieldable means, and means for retracting said abutment member to enable said yieldable means to effect engagement of said engageable means, the means for retracting said abutment member being releasably engaged with the abutment member and being positioned to be engaged by said stop member subsequent to the engagement of the engageable means to be released from said abutment member and thereby permit return of said abutment member into position to be engaged by said stop member and effect separation of said separable portions.

3. In a clutch embodying separable driving and driven portions, engageable means on opposing faces of said portions, yieldable means for effecting engagement of said engageable means, an abutment member having a stop edge thereon and cam means leading to said stop edge, a stop member fixedly arranged on one of said portions movable into engagement with said cam means to be guided onto said stop edge and thereby effect separation of said separable portions and operable when engaged with said stop edge to maintain said portions separated and thereby maintain said engageable means disengaged, and retracting means releasably engageable with the abutment member and operable to retract the stop edge on the abutment member from engagement with the stop member to permit the yieldable means to effect engagement of said engageable means, said retracting means being positioned in the path of movement of said stop member to be engaged thereby after engagement of said engageable means to thereby be released from the abutment member and permit return of the cam means on the abutment member into position to be engaged by said stop member.

4. In a clutch embodying separable driving and driven portions, engageable means on opposing faces of said portions, yieldable means for effecting engagement of said engageable means, an abutment member having a stop edge thereon, a stop member on one of said portions movable into engagement with said stop edge to effect separation of said separable portions and operable when engaged with said stop edge to maintain said portions separated and thereby maintain said engageable means disengaged, and means for retracting said abutment member to enable said yieldable means to effect engagement of said engageable means, the means for retracting said abutment member being releasably engaged with the abutment member and being positioned to be engaged by said stop member subsequent to the engagement of the engageable means to be released from said abutment member and thereby permit return of said abutment member into position to be engaged by said stop member and effect separation of said separable portions.

5. In a clutch embodying a driving portion and a driven portion, one of said portions embodying a part fixed axially with respect to the other portion of the clutch and a part movable between such fixed part and said other portion of the clutch, means interconnecting such fixed and movable parts for conjoint movement, the movable part and said other portion of the clutch embodying separable interfitting portions engageable to interconnect the driving and driven portions of the clutch, an abutment member, means on said movable part and engageable with said abutment member to control engagement and disengagement of said interfitting portions, and means positioned between said fixed and said movable parts and operable to prevent separation of said interfitting portions intermediate the initial engagement of said portions and the engagement of said means on said movable part with said abutment member in the course of operation of said clutch.

6. In a clutch embodying a driving portion and a driven portion, one of said portions embodying a part fixed axially with respect to the other portion of the clutch and a part movable between such fixed part and said other portion of the clutch, means interconnecting such fixed and movable parts for conjoint movement, the movable part and said other portion of the clutch embodying separable interfitting portions engageable to interconnect the driving and driven portions of the clutch, yieldable means interposed between said fixed and movable parts and urging the interfitting portion of the movable part toward the interfitting portion of said other portion of the clutch, an abutment member having a stop edge thereon, means on said movable part and engageable with said stop edge to effect separation of said interfitting portions and operable when engaged with said stop edge to maintain said portions separate and thereby maintain said clutch disengaged, and means positioned between said fixed part and said movable part and operable to prevent separation of said interfitting portions intermediate the initial engagement of said portions and the engagement of said means on said movable part with said stop edge in the course of operation of said clutch.

7. In a clutch embodying separable driving and driven portions, engageable means on opposing faces of said portions, an abutment member, a stop member fixedly arranged on one of said portions and engageable with said abutment member in the course of operation of said clutch to effect separation of said separable portions and the disengagement of said engageable means and also operable to maintain said separable portions separated, and means for retracting said abutment member to enable engagement of said engageable means, said stop member operating to render the retracting means ineffective to thereby permit repositioning of said abutment member subsequent to the engagement of said engageable means to dispose said abutment member in position to be engaged by the stop member and thereby insure separation of said engageable means at a predetermined time in the course of operation of said clutch.

8. In a clutch embodying separable driving and driven portions, yieldable means for effecting engagement of said portions, an abutment member having a stop edge thereon, a stop member on one of said portions movable into engagement with said stop edge to effect separation of said separable portions and operable when engaged with said stop edge to maintain said clutch disengaged, means for retracting said abutment member to enable said yieldable means to effect engagement of said separable portions, the stop member operating to disengage the means for retracting said abutment member from said abutment member and thereby permit repositioning of said abutment member in position to be engaged by said stop member on said one of said portions at a predetermined time in the course of operation of the clutch and thereby insure separation of said separable portions, and means for preventing separation of the driving and driven portions during a predetermined period intermediate the engagement of said portions with each other and the engagement of said stop member with said stop edge.

9. In a clutch embodying a driving portion and a driven portion, one of said portions embodying a part fixed with respect to the other portion of the clutch and a part movable between such fixed part and said other portion of the clutch, means interconnecting such fixed and movable parts for conjoint movement, the movable part and said other portion of the clutch embodying separable interfitting portions engageable to interconnect the driving and driven portions of the clutch, an abutment member, means on said movable part and engageable with said abutment member to control engagement and disengagement of said interfitting portions, said movable part having a relieved portion at the end thereof faced toward said fixed part, said relieved portion being aligned with the means on said movable part engageable with said abutment member, and locking means disposed in said relieved portion when said interfitting portions are disengaged and operable to be disposed between said movable part and said fixed part when said interfitting portions are engaged to maintain said interfitting portions engaged until said relieved portion again moves into alignment with the locking means and said control means on said movable part is engaged with said abutment member to effect disengagement of said interfitting portions.

10. In a clutch embodying a driving portion rotatably mounted on a shaft and including a hub, a driven portion embodying a part fixed to the shaft and a part movable along the shaft intermediate the fixed part and said hub, means interconnecting said fixed and movable parts for conjoint movement with said shaft, said movable part and said hub including interfitting portions, yieldable means interposed between said fixed and movable parts for urging the interfitting portion on the movable part into engagement with the interfitting portion on the hub, a stud on said movable part, a pivotally mounted plate engageable with said stud to hold the interfitting portion on said movable part from engagement with the interfitting portion on said hub, said yieldable means acting upon disengagement of said plate from said stud to effect engagement of the interfitting portion on said movable part with the interfitting portion on said hub to thereby connect the driven portion of said clutch to the driving portion of said clutch, means for retracting said plate from engagement with said stud to thereby free said movable part to the action of said movable means, the means for retracting said plate being releasably engaged with the plate and being positioned to be engaged by said stud subsequent to the engagement of the said interfitting portions to be released from said plate and thereby permit return of said plate into position to be engaged by said stud, and means engageable between said fixed and movable parts subsequent to engagement of said interfitting portions and operable to maintain said interfitting portions in engagement until said stud engages said pivotally mounted plate in the course of an operation of said clutch instituted by engagement of said interfitting portions.

11. In a clutch embodying separable driving and driven portions, means for effecting engagement of said portions, an abutment member, a stop member on one of said portions engageable with said abutment member in the course of operation of said clutch to effect separation of said separable portions and the disengagement of said clutch, said stop member remaining in engagement with said abutment member to maintain said clutch disengaged, retracting means releasably engageable with the abutment member and operable to retract the abutment member from engagement with the stop member to permit operation of the means for effecting engagement of said portions, said retracting means being positioned in the path of movement of said stop member to be engaged by said stop member after engagement of said portions to thereby be released from the abutment member and permit return of the abutment member into position to be engaged by said stop member and thereby effect separation of said separable portions, and means for insuring that the portion on which said stop member is mounted comes to rest in an identical position in each disengagement of said clutch.

12. In a clutch embodying separable driving and driven portions, means for effecting engagement of said portions, an abutment member, a stop member on one of said portions engageable with said abutment member in the course of operation of said clutch to effect separation of said separable portions in the disengagement of said clutch, said abutment member having a stop edge thereon and said stop member moving into engagement with said stop edge to arrest movement of the portion on which said stop member is provided in an identical position in each disengagement of the clutch, retracting means releasably engageable with the abutment member and operable to retract the abutment member from engagement with the stop member to permit operation of the means for effecting engagement of said portions, said retracting means being positioned in the path of movement of said stop member to be engaged by said stop member after engagement of said portions to thereby be released from the abutment member and permit return of the abutment member into position to be engaged by said stop member and thereby effect separation of said separable portions, and means for insuring that said stop member will move into engagement with said stop edge in each disengagement of said clutch.

13. In a clutch embodying separable driving and driven portions, means for effecting engagement of said portions, an abutment member, a stop member on one of said portions engageable with said abutment member in the course of operation of said clutch to effect separation of said separable portions in the disengagement of said clutch, said abutment member having a stop edge thereon and said stop member moving into engagement with said stop edge to arrest movement of the portion on which said stop member is provided in an identical position in each disengagement of the clutch, retracting means releasably engageable with the abutment member and operable to retract the abutment member from engagement with the stop member to permit operation of the means for effecting engagement of said portions, said retracting means being positioned in the path of movement of said stop member to be engaged by said stop member after engagement of said portions to thereby be released from the abutment member and permit return of the abutment member into position to be engaged by said stop member and thereby effect separation of said separable portions, a cam member fixed to the portion of said clutch on which said stop member is provided, and means cooperating with said cam member and operable to insure engagement of said stop member with said stop edge in each disengagement of the clutch.

14. In a clutch embodying separable driving and driven portions, yieldable means for effecting engagement of said portions, an abutment member having a stop edge thereon and cam means leading to said stop edge and an abutment edge along said stop edge, a stop member on one of said portions movable into engagement with said cam means to be guided onto said stop edge and into engagement with said abutment edge to effect separation of said separable portions and to arrest movement of the portion on which said stop member is provided in an identical position each time the clutch is disengaged, said stop member engaging said stop edge and said abutment edge to maintain the separable portions separated and thereby maintain said clutch disengaged, and retracting means releasably engageable with the abutment member and operable to retract the stop edge on the abutment member from engagement with the stop member to permit the yieldable means to effect engagement of said separable portions, said retracting means being positioned in the path of movement of said stop member to be engaged thereby after engagement of said portions to thereby be released from the abutment member and permit return of the cam means on the abutment member into position to be engaged by said stop member.

15. In a clutch embodying separable driving and driven portion, yieldable means for effecting engagement of said portions, an abutment member having a stop edge thereon and cam means leading to said stop edge and an abutment edge along said stop edge, a stop member on one of said portions movable into engagement with said cam means to be guided onto said stop edge and into engagement with said abutment edge to effect separation of said separable portions and to arrest movement of the portion on which said stop member is provided in an identical position each time the clutch is disengaged, said stop member engaging said stop edge and said abutment edge to maintain the separable portions separated and thereby maintain said clutch disengaged, retracting means releasably engageable with the abutment member and operable to retract the stop edge on the abutment member from engagement with the stop member to permit the yieldable means to effect engagement of said separable portions, said retracting means being positioned in the path of movement of said stop member to be engaged thereby after engagement of said portions to thereby be released from the abutment member and permit return of the cam means on the abutment member into position to be engaged by said stop member, and means for insuring that said stop member will move into engagement with said abutment edge in each disengagement of said clutch.

16. In a clutch embodying separable driving and driven portions, yieldable means for effecting engagement of said portions, an abutment member having a stop edge thereon and cam means leading to said stop edge and an abutment edge along said stop edge, a stop member on one of said portions movable into engagement with said cam means to be guided onto said stop edge and into engagement with said abutment edge to effect separation of said separable portions and to arrest movement of the portion on which said stop member is provided in an identical position each time the clutch is disengaged, said stop member engaging said stop edge and said abutment edge to maintain the separable portions separated and thereby maintain said clutch disengaged, retracting means releasably engageable with the abutment member and operable to retract the stop edge on the abutment member from engagement with the stop member to permit the yieldable means to effect engagement of said separable portions, said retracting means being positioned in the path of movement of said stop member to be engaged thereby after engagement of said portions to thereby be released from the abutment member and permit return of the cam means on the abutment member into position to be engaged by said stop member, a cam member fixed to the portion of said clutch on which said stop member is provided, and means cooperating with said cam member and operable to insure engagement of said stop member with said abutment edge in each disengagement of the clutch.

17. In a clutch embodying separable driving and driven portions, an abutment member, a stop member on one of said portions engageable with said abutment member in the course of operation of said clutch to effect separation of said separable portions and the disengagement of said clutch, a member movable relative to the portion on which said stop member is mounted and including a portion formed to receive said stop member when said stop member is engaged with said abutment member and the separable portions are separated, means for retracting said abutment member from engagement with said stop member, means operable on the movable member upon retraction of the abutment member to move the portion on the movable member adapted to receive said stop member out of alignment with said stop member and thereby effect engagement of said separable portions, and means for moving said movable member into a position wherein said stop member may move into the portion adapted to receive the same as said stop member moves into engagement with said abutment member to effect separation of said separable portions.

18. In a clutch embodying separable driving and driven portions, an abutment member, a stop member on one of said portions engageable with said abutment member in the course of operation of said clutch to effect separation of said separable portions and the disengagement of said clutch, a member movable relative to the portion on which said stop member is mounted and having a recess formed therein to receive said stop member when said stop member is engaged with the abutment member and the separable portions are separated, means for retracting said abutment member from engagement with said stop member, yieldable means effective on the movable member and operative upon retraction of the abutment member to so move the movable member that the recess therein is moved from alignment with the stop member and said stop member is moved into engagement with a face portion on the movable member adjacent the recess therein, engagement of the stop member with said face portion effecting engagement of the separable portions, and means for moving said movable member to disengage the face portion thereon from said stop member and to align said recess with said stop member as said stop member moves into engagement with said abutment member, engagement of said stop member with said abutment member and the movement thereof into said recess effecting separation of said separable portions.

19. In a clutch embodying separable driving and driven portions, an abutment member, a stop member on one of said portions engageable with said abutment member in the course of operation of said clutch to effect separation of said separable portions and the disengagement of said clutch, a member movable relative to the portion on which said stop member is mounted and having a recess formed therein to receive said stop member when said stop member is engaged with the abutment member and the separable portions are separated, means for retracting said abutment member from engagement with said stop member, yieldable means effective on the movable member and operative upon retraction of the abutment member to so move the movable member that the recess therein is moved from alignment with the stop member and said stop member is moved into engagement with a face portion on the movable member adjacent the recess therein, engagement of the stop member with said face portion effecting engagement of the separable portions, and means on the portion carrying said stop member and movable therewith upon engagement of said clutch and positioned to move said movable member as said stop member moves into engagement with said abutment member subsequent to engagement of said separable portions, said last-named means being operative to move said face portion away from said stop member and to dispose said recess in position to receive said stop member whereby as said stop member moves along said abutment member separation of said separable portions is effected as said stop member moves into said recess.

20. In a clutch embodying a shaft, a driving portion rotatably mounted on said shaft, a fixed part on said shaft, a driven portion slidably but non-rotatably mounted on said shaft intermediate said driving portion and said fixed part, interengaging portions on said driving and driven portions for interconnecting the same for conjoint movement, a rotatably mounted collar positioned adjacent said fixed part, a stop pin on said driven portion, an abutment member having a stop edge thereon engageable with said pin to maintain the interengaging portions separated, said collar having a recess therein adapted to receive said pin when said pin is engaged with said stop edge, means for retracting said abutment member from engagement with said pin and operable to permit restoration of said abutment member into position to engage said pin after engagement of said interengaging portions and the start of movement of said driven portion with said driving portion, means effective on said collar and operative upon retraction of said abutment member from engagement with said stop pin to move the recess in said collar out of alignment with said stop pin, said collar having a face portion thereon engageable by said pin when said recess is moved out of alignment therewith and positioned to act through said pin to cause engagement of said interengaging portions, and means operative to move said collar to dispose the recess therein in position to receive said pin as said pin engages the stop edge on said abutment member whereby as said pin moves along said stop edge and into said recess disengagement of said interengaging portions is effected.

WALTER T. GOLLWITZER.